United States Patent
Blinder et al.

(10) Patent No.: US 9,929,996 B2
(45) Date of Patent: Mar. 27, 2018

(54) COMMON EMAIL DATABASE FOR A PLURALITY OF USERS

(71) Applicant: Emmerge, Inc., San Francisco, CA (US)

(72) Inventors: Marcus Andrew Blinder, San Francisco, CA (US); Jeremy Alan Dunn, Oakland, CA (US); Colin Anthony McCloskey, Philadelphia, PA (US); Jeffrey Lee Sparks, Belmont, CA (US); Mark Henry Wheeler, San Francisco, CA (US)

(73) Assignee: Emmerge, Inc., San Francisco, CA (US)

( * ) Notice: Subject to any disclaimer, the term of this patent is extended or adjusted under 35 U.S.C. 154(b) by 389 days.

(21) Appl. No.: 14/657,940

(22) Filed: Mar. 13, 2015

(65) Prior Publication Data
US 2016/0269336 A1    Sep. 15, 2016

(51) Int. Cl.
*G06F 15/16* (2006.01)
*H04L 12/58* (2006.01)
*G06Q 10/10* (2012.01)

(52) U.S. Cl.
CPC ........... *H04L 51/22* (2013.01); *G06Q 10/107* (2013.01)

(58) Field of Classification Search
CPC ......... H04L 51/22; H04L 51/36; H04L 51/08; H04L 51/16; G06Q 10/107
See application file for complete search history.

(56) References Cited

U.S. PATENT DOCUMENTS

| | | | |
|---|---|---|---|
| 6,327,046 B1* | 12/2001 | Miyamoto | G06Q 10/10 358/1.15 |
| 8,392,409 B1 | 3/2013 | Kashyap et al. | |
| 9,619,783 B2 | 4/2017 | Madnani | |
| 2003/0233419 A1* | 12/2003 | Beringer | G06Q 10/107 709/206 |
| 2006/0277205 A1* | 12/2006 | Song | G06N 5/02 |
| 2007/0130369 A1* | 6/2007 | Nayak | G06Q 10/107 709/246 |
| 2007/0150513 A1 | 6/2007 | Vanden Huevel et al. | |
| 2007/0280211 A1 | 12/2007 | Malueg | |
| 2009/0198779 A1* | 8/2009 | Agrawal | H04L 51/063 709/206 |
| 2010/0250683 A1* | 9/2010 | Hoyne | G06Q 10/10 709/206 |
| 2012/0011192 A1* | 1/2012 | Meister | G06Q 10/107 709/203 |
| 2012/0124147 A1 | 5/2012 | Hamlin et al. | |
| 2012/0143972 A1 | 6/2012 | Malik et al. | |
| 2015/0012862 A1* | 1/2015 | Ikeda | G06F 3/0486 715/770 |
| 2015/0100896 A1 | 4/2015 | Shmarovoz | |

(Continued)

*Primary Examiner* — Jonathan Bui
(74) *Attorney, Agent, or Firm* — Van Pelt, Yi & James LLP

(57) ABSTRACT

Enhancing email is disclosed. An email message is received. Content of the email message is stored in a common email database including email data accessible by a plurality of platform users. Access to the email data is provided via a platform that provides enhanced messaging functions to the platform users. The content of the email message is transmitted via a conventional email system. The content of the email message is accessible both via the platform and by an email client accessing the conventional email system.

20 Claims, 11 Drawing Sheets

(56) References Cited

U.S. PATENT DOCUMENTS

2015/0121203 A1\* 4/2015 Saund ................... G06F 17/211
             715/249
2015/0188869 A1  7/2015 Gilad
2015/0195227 A1\* 7/2015 Kassemi ................. H04L 63/08
             709/206

\* cited by examiner

FIG. 9

COMMON EMAIL DATABASE FOR A PLURALITY OF USERS

BACKGROUND OF THE INVENTION

Conventional email technology is based on early networking and server technology. Although networking and server technologies have vastly improved over the years, email has essentially remained the same. This is in part due to the need to maintain backwards compatibility with legacy systems and devices. For example, it would be extremely difficult to add or extend features to email that would not be compatible with the existing near universal technology framework. Thus, it would be desirable to be able to add enhancement features of email while at the same time remain compatible with conventional email systems.

BRIEF DESCRIPTION OF THE DRAWINGS

Various embodiments of the invention are disclosed in the following detailed description and the accompanying drawings.

FIG. 9 is a diagram illustrating an example of a user interface for creating a task item.

DETAILED DESCRIPTION

Figure 1:
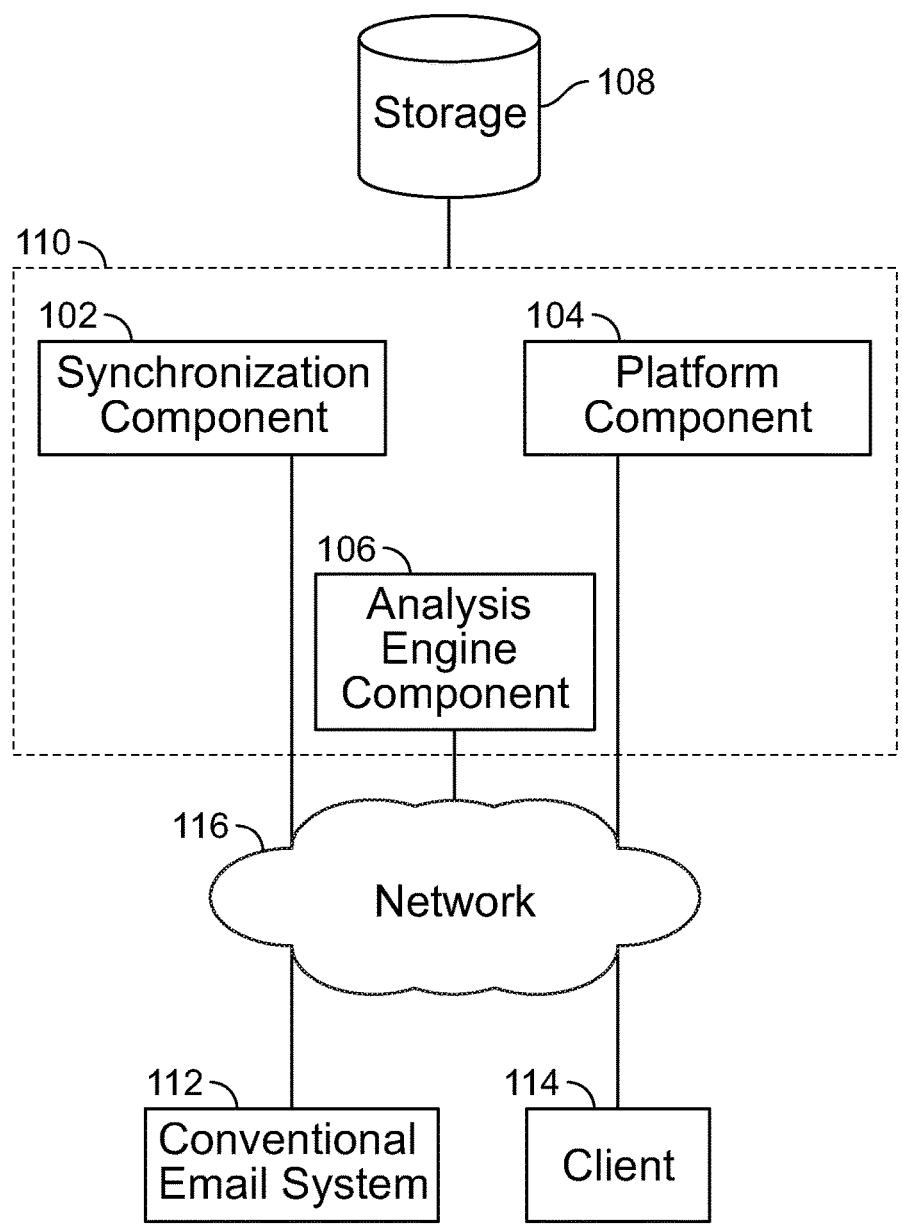
FIG. 1 is a block diagram illustrating an embodiment of a system for enhancing email.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enhancing email is disclosed. In some embodiments, an email message is received. For example, the email message is received via a platform that provides enhanced functions to platform users. In some embodiments, an enhancement associated with the email is processed. For example, the enhancement is a functionality that is not offered by conventional email systems. Examples of the enhancement include labeling the email message, creating a task item associated with the email, and advanced message thread handling, among others. Content of the email message is stored in a common email database including email data accessible by a plurality of platform users. Access to the email data is provided via a platform that provides to platform users enhanced functions associated with the email data. For example, traditionally email has been stored in separate storage silos for each individual user. However, to enable enhanced collaborative features, email content of a plurality of users is stored in the same centralized common email database that integrates with components that enable the enhancements. The common email database may also allow a single copy of the email message to be stored for all participants of the email message rather than separately storing individual copies for each of the participants of the email message. Additionally, the common email database may allow faster email interactions between the platform users because the platform users access the same database. In some embodiments, the content of the email is transmitted via a conventional email system and the content of the email is accessible both via the platform and by an email client accessing the conventional email system. For example, to retain compatibility to legacy email technology, a copy of the email received via the platform is sent and synchronized with IMAP (i.e., Internet Message Access Protocol) email accounts of the platform users. Thus, a platform user may choose to interact with the email message via the platform or via the traditional email client. Additionally, a user that is not a platform user is able to interact with the platform and another platform user because the platform maintains compatibility with legacy email technology.

FIG. 1 is a block diagram illustrating an embodiment of a system for enhancing email. Synchronization component 102, platform component 104, and analysis engine component 106 are connected to network 116. In the example shown, synchronization component 102, platform component 104, and analysis engine component 106 are included in email enhancement system 110. However, in various embodiments, synchronization component 102, platform component 104, and analysis engine component 106 may be in one or more separate systems. For example, one or more of the components of email enhancement system 110 may be included in a system separate from email enhancement system 110.

Email enhancement system 110 and synchronization component 102, platform component 104, and analysis engine component 106 are connected to storage 108. Storage 108 stores a common email database and may also store data associated with enhancement features provided by one or more components of system 110. Storage 108 may be a local storage associated with system 110 and/or a networked storage (e.g., storage connected to network 116). The common email database includes email data of a plurality of users of system 110. For example, email messages of a plurality of users are stored in the same common email database and this database is leveraged to offer enhancements to conventional email features. Synchronization component 102 allows system 110 to maintain compatibility to conventional email technology by synchronizing data between each conventional email account of each user and email data stored in a common email database of storage 108. For example, each user of system 110 may have a conventional email account hosted by one or more conventional email systems and system 110 enhances this email account by synchronizing email received via the conventional email system to storage 108 and synchronizing email sent using system 110 to the conventional email system. Conventional email system 112 is one example of a conventional email system that hosts the email account of a user of system 110 that is being synchronized with common email database of storage 108 of system 110. For example, conventional email system 112 may include an IMAP server and/or an online server of an online email service (e.g., GMAIL service provided by Google Inc. of Mountain View, Calif.). Conventional email system 112 may be one of a plurality of email systems of a plurality of email accounts being synchronized with system 110.

Analysis engine component 106 analyzes data of storage 108 (e.g., email data received from conventional email system 112) to enable enhancement functions of system 110. For example, analysis engine component 106 performs analysis to automatically label received email messages with one or more labels to automatically categorize the email messages. Platform component 104 provides and/or receives instructions from an interface (e.g., user interface, webpage, Application Programming Interface, etc.) to system 110. For example, platform component 104 provides a user interface (e.g., web interface, mobile application interface, etc.) to allow users to interact with the enhanced email features provided by system 110. Client 114 (e.g., user computer, mobile device, wearable computer, etc.) is a client of a user of system 110 that interacts with platform component 104 to access the email data of a platform user as well as utilize the platform's enhanced features. In the example shown, client 114 may access email messages of the user via platform component 104 or conventional email system 112 because email messages are synchronized between enhanced email system 110 and conventional email system 112. However, certain enhanced features may only be available via enhanced email system 110 while certain enhanced features may be also made available via conventional email system 112 by emulating features though hyperlinks and enhanced email system generated messages.

The components shown in FIG. 1 may be implemented in one or more computers, servers, storage devices, networking components, and/or virtual components/networks. For example, any number of components of system 110 shown in FIG. 1 may be included in any number of devices. One or more of the following may be included in network 116: a direct or indirect physical communication connection, mobile communication network, Internet, intranet, Local Area Network, Wide Area Network, Storage Area Network, a wireless network, a cellular network, and any other form of connecting two or more systems, components, or storage devices together. Other communication paths may exist and the example of FIG. 1 has been simplified to illustrate the example clearly. Although single instances of components have been shown to simplify the diagram, additional instances of any of the components shown in FIG. 1 may exist. For example, storage 108 may be a distributed storage across nodes and system 110 may include a plurality of each of its components implemented across multiple servers. In various embodiments, there exists a plurality of conventional email systems and clients interacting with one or more components of system 110. Components not shown in FIG. 1 may also exist.

Figure 2:
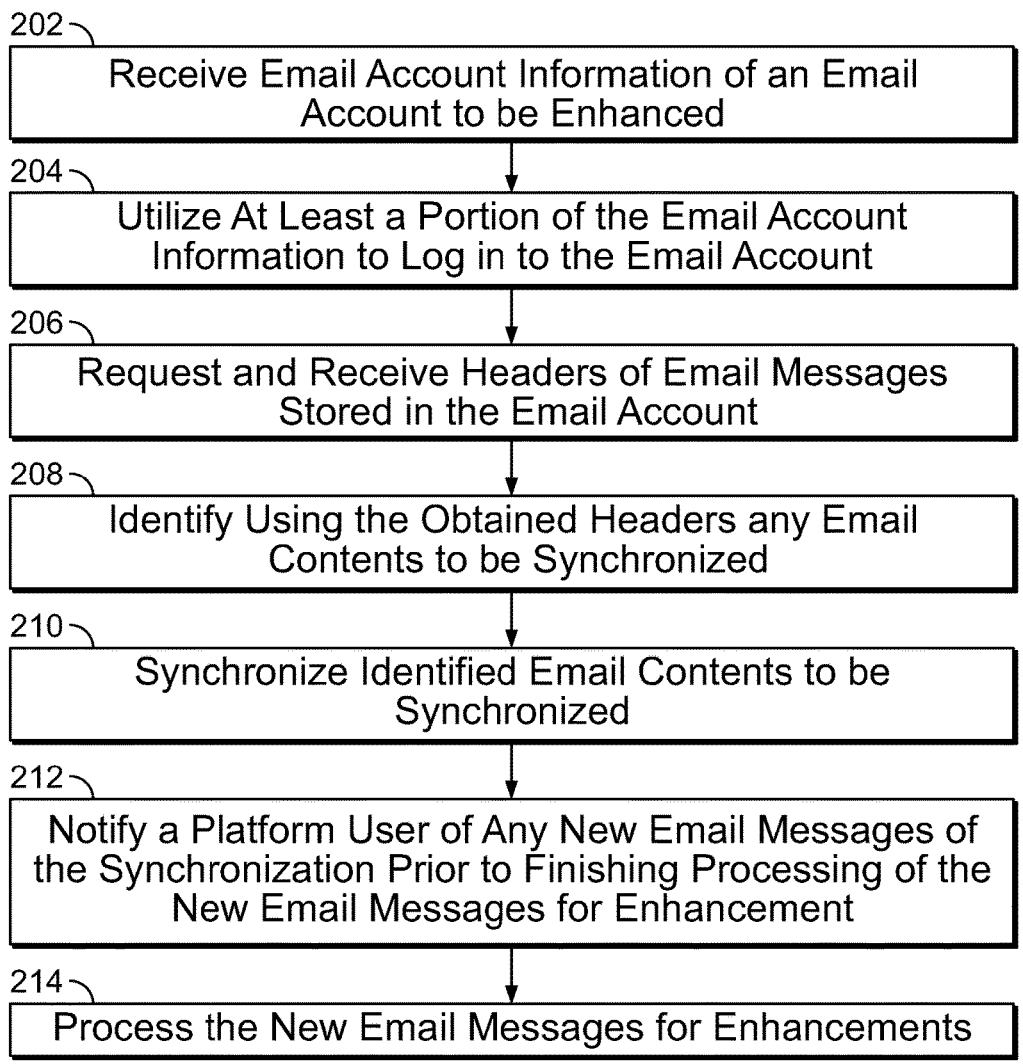
FIG. 2 is a flowchart illustrating an embodiment of a process for obtaining and synchronizing email messages between a conventional email system and an enhanced email system.

FIG. 2 is a flowchart illustrating an embodiment of a process for obtaining and synchronizing email messages between a conventional email system and an enhanced email system. The process of FIG. 2 may be implemented on one or more components of system 110 of FIG. 1. For example, the process of FIG. 2 is implemented on synchronization component 102 and analysis engine component 106 of FIG. 1. In some embodiments, at least a portion of the process of FIG. 2 may be repeated for each email account to be synchronized. For example, multiple email accounts of a same user and email accounts of different users (e.g., users of an enhanced email system) are synchronized. In some embodiments, at least a portion of the process of FIG. 2 may be performed periodically and/or dynamically. For example, steps 204-214 are repeated at a periodic interval, when requested, and/or when it is detected that email account(s) need to be synchronized (e.g., push notification of new email content).

In some embodiments, by synchronizing email messages between the conventional email system and the enhanced email system, the enhanced email system maintains a copy of the email data of an email account of interest of the conventional email system to provide enhancement features using the copy of the email data. Additionally, any changes made by the enhanced email system can be synchronized back to the conventional email system to allow backwards compatibility with other forms accessing the email data via the conventional email system.

At 202, email account information of an email account to be enhanced is received (e.g., email account to be utilized with an email enhancement service). For example, a user registers to an email enhancement service that will add enhanced functionality to an existing email account of the user and the user provides login information of the email account to be enhanced. Once the user is registered, the user is a platform user of the email enhancement service (e.g., service provided by system 110 of FIG. 1). In some embodiments, the email account information includes information to register for a new email account. For example, the user desires to register for a new email account with enhanced functionality and specifies information to open the new email account. Examples of the email account information include email server settings, username, password, email address, specification of an email service provider, and/or other email account associated information. In some embodiments, the email account information is stored in storage (e.g., storage 108) for retrieval when needed to retrieve, send, and/or synchronize email data of the email account. Examples of the email account include an IMAP account, a POP (i.e., Post Office Protocol) account, an online email account, an email service account, a webmail account, or any other type of email account.

At 204, at least a portion of the email account information is utilized to log in to the email account. For example, a connection is established with an email server of the email account. In some embodiments, logging in to the email account includes providing login credentials to an authentication/login service. In some embodiments, logging in to the email account includes providing login credentials received in 202 to access the email account via a conventional email system (e.g., conventional email system 112 of FIG. 1). Examples of the conventional email system include an IMAP system, a POP system, an online email system, an email service system, or a webmail system.

At 206, headers of email messages stored in the email account are requested and received. By analyzing the headers of the email messages, new email messages of the email account that needs to be synchronized with the email enhancement system may be discovered. In some embodiments, only headers of email messages received and/or sent since a previous request are requested and received. For example, email messages of an email account of the conventional email system are periodically synchronized with the email enhancement system and only headers of new email messages since the last synchronization are requested and received.

At 208, any email contents to be synchronized is identified using the obtained headers. For example, email messages that are not already stored in storage (e.g., common email database) of an email enhancement system (e.g., system 110 of FIG. 1) are identified for synchronization. In some embodiments, identifying email contents to be synchronized includes identifying changes since a previous instance of a previous synchronization. For example, a new email message may have been received, an email message may have moved, an email status (e.g., read status) may have changed, and/or an email message may have been deleted and these changes are to be reflected in a copy of the email messages to be stored by the email enhancement system (e.g., stored in common email database).

In some embodiments, identifying email contents to be synchronized includes determining email contents to be obtained. For example, although email message headers have been obtained to quickly identify contents to be synchronized without downloading full contents of email messages, full contents of new email messages have not been downloaded yet for storage and enhancement by the email enhancement system (e.g., to be stored in common email database). In some cases, although an email message may be marked as a new email message that has not been already fully downloaded, full contents of the email may already be stored by the email enhancement system because it was an email message sent via the email enhancement system (e.g., sent using the process of FIG. 3). In some embodiments, one or more headers of an email message identify whether the email message has been generated using the email enhancement system. For example, when an email is sent via the email enhancement system, the email enhancement system includes a specific tag that identifies the email message as having been generated using the email enhancement system. In some embodiments, in the event a header of an email identifies that the email message has been generated using the email enhancement system, the email is not identified to be obtained.

At 210, identified email contents to be synchronized are synchronized. In some embodiments, synchronizing email contents includes performing one or more of the following: move an email message from one folder to another folder, update a read status of an email message, delete an email message, download contents of an email message, and download attachments of an email message. In various embodiments, examples of an attachment of an email message include a file included in the email message, content included in the email message using MIME (Multi-Purpose Internet Mail Extensions), content linked by the email message and content stored in networked cloud storage referenced by the email message.

In some embodiments, synchronizing the email contents includes downloading new email content from the conventional email system and storing the new email content in a common email database (e.g., database stored in storage 108 of FIG. 1). For example, traditionally, email messages have been stored in separate storage silos for each individual user. However, to enable enhanced collaborative features, emails of a plurality of platform users (e.g., users of email enhancement system) are stored in the same centralized common email database that integrates with components that enable the enhancements. The common email database may also allow a single copy of the email message to be stored for all participants of the email message that are platform users rather than separately storing individual copies for each of the participants of the email message. Additionally, the common email database may improve the functioning of the server computer by allowing faster email interactions between the platform users. In some embodiments, storing the new email content includes updating a data structure of the email enhancement system that tracks email threading information. For example, for each email thread, the data structure tracks email messages and participants of the email thread and the data structure is updated to reflect any new email messages belonging to a corresponding email thread.

At 212, a platform user is notified of any new email messages prior to finishing processing of the new email messages for enhancement. For example, it may take time to process any new email message for any enhancements, and rather than not delivering the email message until the enhancement processing is complete, new email messages are delivered right away to allow the platform user to receive and view new email messages as soon as possible.

At 214, the new email messages are processed for enhancements. The enhancement processing of the new email messages may be performed asynchronously and the enhancements are provided later when the enhancement processing has been completed. For example, the enhancement processing of the new email messages is performed asynchronously with a process that obtains new email messages and updates the common email database. Examples of the enhancements include automatically assigning one or more labels to the new email messages. Another example of the enhancements includes processing the new email messages to identify and process any text commands included in the new email messages. For example, a user is able to specify a label for an email message or create a to-do task item using an appropriate text command specified within an email message. Another example of the enhancements includes enhanced email thread management. For example, email messages of an email thread are tracked and associated together to allow enhancements to be applied to the entire email thread together (e.g., a label for entire email thread). In some embodiments, enhancement processing of the new email messages includes processing an attachment (e.g., data included in or linked by an email message) of the new email messages. For example, contents and/or metadata information of one or more online cloud storage files referenced by a hyperlink included in an email message is automatically obtained and provided (e.g., visually indicated) to a user.

Figure 3:
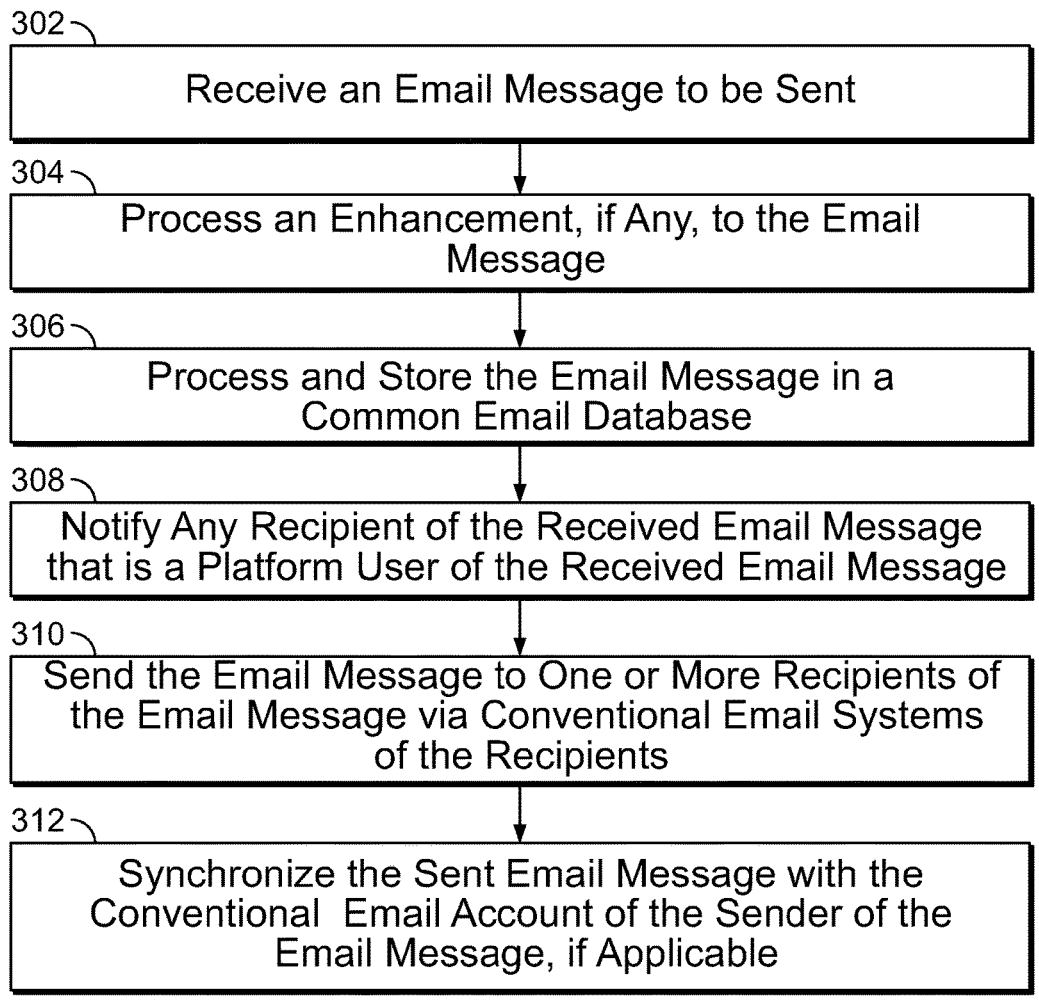
FIG. 3 is a flowchart illustrating an embodiment of a process for sending an email message.

FIG. 3 is a flowchart illustrating an embodiment of a process for sending an email message. The process of FIG. 3 may be implemented on one or more components of system 110 of FIG. 1. For example, the process of FIG. 3 is implemented on synchronization component 102 and platform component 104 of FIG. 1. In some embodiments, at least a portion of the process of FIG. 2 may be repeated for each new email message to be sent by an email enhancement system.

At 302, an email message to be sent is received. For example, an email message composed using an interface of an email enhancement system (e.g., system 110 of FIG. 1) is received to be sent. In some embodiments, the email message is received via a mobile application of the email enhancement system. For example, a mobile application of client 114 of FIG. 1 receives contents of the email message and provides the email message to platform component 104 to be sent. In some embodiments, the email message is received via a web interface. For example, a webpage provided by platform component 104 of FIG. 1 is utilized by a user of client 114 to compose the email message to be sent and the composed email message is received by platform component 104.

At 304, an enhancement, if any, to the email message is processed. In some embodiments, processing the enhancement includes processing a label specified for the email message. In some embodiments, processing the enhancement includes processing a to-do task item specified for the email message. In some embodiments, processing the enhancement includes processing the email message for enhanced email threading associated with the email message.

At 306, the email message is processed and stored in a common email database. In some embodiments, processing the email message includes converting the email message into a format suitable for storage in the common email database. In some embodiments, processing the email message includes identifying data items associated with one or more enhancements of the email message to be stored in one or more data structures. For example, labels of the email message may be stored in the common email database along with contents of the email message. In some embodiments, the data items associated with one or more enhancements of the email message are stored in a different data structure than the common email database. For example a separate data structure tracks email message threads and another separate data structure tracks to-do task items associated with email messages.

The common email database may be any data structure configured to store email data. In some embodiments, storing the email message includes storing contents of the received email message as well as any attachments of the received email message in the common email database. In some embodiments, the common email database (e.g., database stored in storage 108 of FIG. 1) stores email message for a plurality of platform users. For example, to enable enhanced collaborative features, email data of a plurality of platform users of the email enhancement system is stored in the same centralized common email database that integrates with components that enable the enhancements. The common email database may also allow a single copy of an email message to be stored for all participants of the email message that are platform users rather than separately storing individual copies of the email message for each of the participants of the email message.

At 308, any recipient of the received email message that is a platform user of an email enhancement system is notified of the received email message. For example, a recipient user that is also utilizing the same email enhancement system as the sender of the email message can be quickly notified of the email message without the need to download or save a copy of the email message again because the email message is already stored in the common email database that is shared with the recipient platform user. This may allow the recipient user to receive and view new email messages significantly faster than conventional email delivery systems that require transmission and/or copying of data.

At 310, the email message is sent to one or more recipients of the email message via conventional email systems of the recipients. In some embodiments, sending the email message includes sending a copy of the email message via an outgoing email server to email addresses of the recipients of the email message. In some embodiments, the outgoing email server is the outgoing email server of the conventional email system of the sending user. The recipient platform users that were notified in 308 may also be sent the email message via the conventional email systems to allow synchronization of the email message with the conventional email systems of the recipient platform users. In some embodiments, the sent email message to the recipient platform users may be identified in 208 of FIG. 2 as already stored in the common email database and not obtained again when email accounts of the recipient platform users are synchronized (e.g., synchronized using the process of FIG. 2). In some embodiments, sending the email message includes including one or more identifiers in a header in the email message that identify one or more properties associated with the message. For example, an included identifier identifies that the email message was generated using the email enhancement system. This identifier included in the header may signal that the email message does not need to be downloaded in its entirety to be synchronized with the common email database. In another example, an included identifier specifies an email thread identifier. For example, each thread of one or more related messages (e.g., email thread includes email messages between same participants that are succeeding replies starting with the original email message) is assigned a unique identifier that is included in the header of email messages of the email thread. This thread identifier may allow a recipient of the email message to quickly identify the email thread of the email message and apply any enhancements associated with the email thread to the email message.

At 312, the sent email message is synchronized with the conventional email account of the sender of the email message, if applicable. For example, the email message is provided to the conventional email account of the sender to be stored by the conventional email server of the sender.

Figure 4:
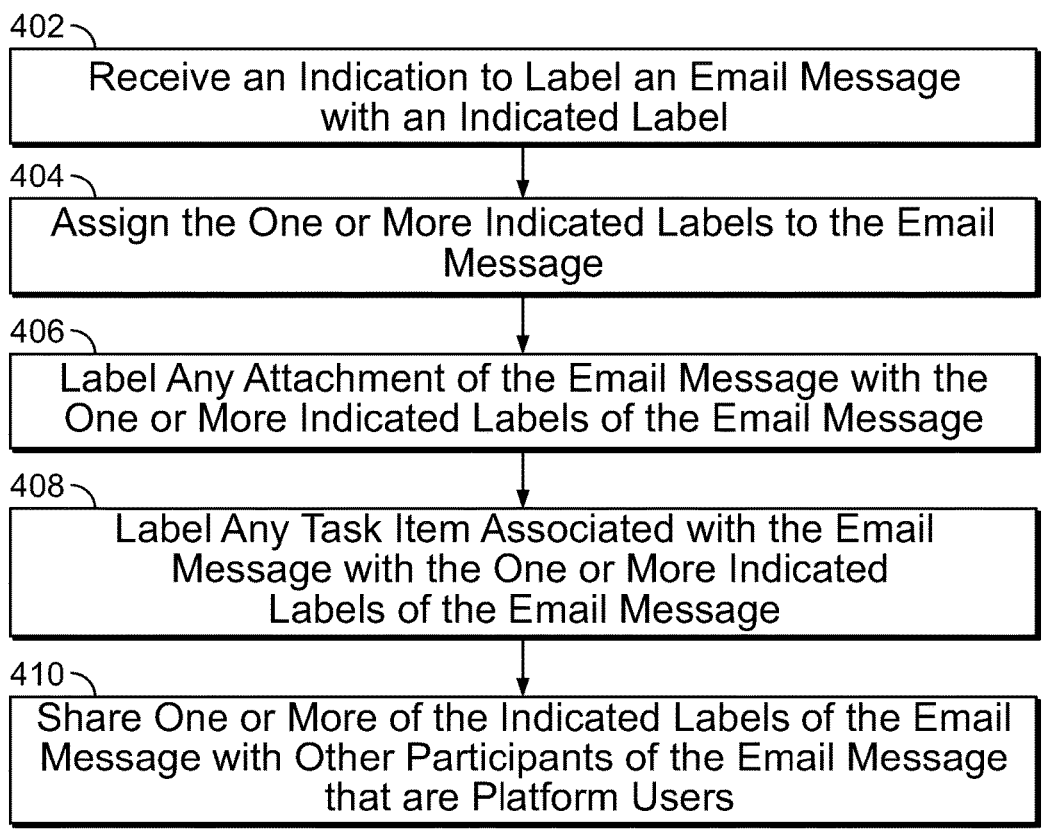
FIG. 4 is a flowchart illustrating an embodiment of a process for labeling an email message.

FIG. 4 is a flowchart illustrating an embodiment of a process for labeling an email message. The process of FIG. 4 may be implemented on one or more components of system 110 of FIG. 1. In some embodiments, at least a portion of the process of FIG. 4 is included in 214 of FIG. 2 and/or 304 of FIG. 3.

At 402, an indication to label an email message with an indicated label is received. In some embodiments, one or more labels of an email message allow the email message to be categorized and organized according to the labels. By assigning the same label to two different email messages, the messages may be associated and organized together for retrieval together. For example, a user is able to search for email messages with one or more specified labels and/or only display email messages with one or more specified labels. In another example, key concepts of an email message may be identified by assigning one or more labels to the email message that identify the key concepts.

In some embodiments, the indication to label the email message is received via an interface provided by a user interface of the email enhancement system. For example, the indication is received via a webpage and/or mobile device application utilized by client 114 to communicate with email enhancement server 110 of FIG. 1. In some embodiments, the indication is received at platform component 104 of FIG. 1.

In some embodiments, the indication to label is received via a text input in an input field dedicated to specifying a label for the email message. For example, a text provided in a text box dedicated to inputting labels is received as the description of a new label to be created. In another example, a user selects a label among a list of labels to associate the selected label with the email message. In some embodiments, a user drags and drops to a specified user interface location a selected label among a list of labels to associate the selected label with the email message. In some embodiments, the indication to label the email message is received via a selection of text included in content of the email message. In some embodiments, a user highlights one or more words in a body of the email message to indicate the word as a label of the message. For example, when a user highlights text of the email message when composing the email message, a context menu is provided and one of the items in the context menu indicates a command to utilize the highlighted text as the description of a new label to be created for the email message.

In some embodiments, the indication to label is received via a text command within a content of the email message. For example, a user types a special command character(s) (e.g., "#") followed by a text identifier of the label to specify a new label for the email message within the body text of the email message. In one example, when a user types "#projectx" within a body of the email message, the user is labeling the email message with the label "projectx." In some embodiments, the special command character(s) to specify the label may be configurable. In some embodiments, a visual indication is provided that a text of the email message has been recognized as a label. In some embodiments, a user may unmark content of the email message that has been recognized as a label to indicate that the indicated content of the email message is not a label. In some embodiments, the text command is provided by an email sender that is not a platform user. For example, the email sender that is not a platform user may include a text command within a text body of an email message sent to a recipient platform user to label the email message.

In some embodiments, one or more suggested labels are suggested based on an analysis of the recipient of the email message, sender of the email message, subject of the email message, text content of the email message, an attachment of the email message, and/or other labels of the email message, and a user may confirm one or more suggestions to add the selected suggestion as a label. In some embodiments, one or more labels are added to the email message based on one or more rules. For example, a user is able to specify a rule/command that automatically adds a tag to an email message if a specified content is included in the email message, a specific recipient is to receive the message, and/or other properties of the email message match specified constraint(s) of the rule.

At 404, the one or more indicated labels are assigned to the email message. In some embodiments, assigning the indicated labels includes storing the indicated labels in one or more data structures/databases. For example, the indicated labels are stored with the email message in the common email database. In some embodiments, the set of labels for each email message is unique to each platform user despite only storing a single copy of the email message in the common email database. For example, for each email message stored at the common email database, a separate set of one or more labels assigned to the email message is maintained for each platform user email participant (e.g., sender and recipients of the email message that are platform users) in a separate data structure and/or in the same common email database.

In some embodiments, assigning the indicated labels to the email message includes processing an enhancement associated with a label of the email message. For example, a processing rule is triggered based on a label. An example of the triggered rule includes providing a more salient notification of the email message in the event the email message is labeled with a triggering label. In another example, if an email message is labeled with another triggering label, the email message may be automatically marked as read without increasing the unread counter and providing a notification of the email, and/or archiving the email message.

At 406, any attachment of the email message is labeled with the one or more indicated labels of the email message. For example, the email attachments may be separately searched and/or organized based on its assigned labels. In some embodiments, labeling an email attachment includes associating a stored label with the email attachment in a data entry of a data structure that stores the email attachment and/or the label. In some embodiments, when an attachment of the email message is labeled with a new label, the email message associated with the attachment is automatically labeled with the new label as well.

At 408, any task item associated with the email message is labeled with the one or more indicated labels of the email message. For example, a to-do task item associated with an email message can be separately searched and/or organized and by assigning labels to task items, the task items may be searched and/or organized based on assigned labels. In some embodiments, labeling a task item includes associating a stored label with the task item in a data entry of a data structure that stores and tracks the task item and/or the label. In some embodiments, when a task item associated with the email message is labeled with a new label, the email message associated with the task item is automatically labeled with the new label as well.

At 410, one or more of the indicated labels of the email message are shared with other participants of the email message that are platform users. Rather than have each individual platform user of the enhanced email system separately label and maintain labels for email messages of each platform user, work performed by one platform user to label an email message is leveraged to label the email message with the provided label for every participant of the email message that is a platform user. For example, a label of the email message is applied across all participants of the email message that are platform users. In some embodiments, sharing an indicated label includes copying the label and storing the label across the participants of the email message that are platform users. In some embodiments, sharing an indicated label includes storing/identifying the label as a global label applicable to all participants of the email message.

In some embodiments, only certain types of labels are shared with other participants of the email message. For example, only labels created by a platform user are shared (e.g., as compared to auto generated). In another example, only labels identified by a platform user to be shared are shared. Certain labels may be private labels (e.g., only applicable to a single platform user) and other labels may be public labels (e.g., applicable for the email message across any platform user).

In some embodiments, any label of any email message belonging to an email thread is applied to the entire email thread (e.g., applied to every email message of the email thread). For example, labels are maintained on the email thread level rather than for each individual email message. In one example, when a user specifies a new label to an email message of an email thread, the new label is applied to the thread and consequently all email messages of the email thread inherit the new label. In some embodiments, not shared private labels may be specified for an entire email thread on an individual platform user basis.

In some embodiments, a data structure that tracks email threads includes a data entry for each email thread that stores one or more shared labels for the email thread, one or more not shared private labels for specific platform users for the thread, identification(s) of email messages of the thread, identification(s) of any other related email thread(s), and a list of participant(s) of the email thread. This data structure may be separate from the common email database and/or included in the common email database.

Figure 5:
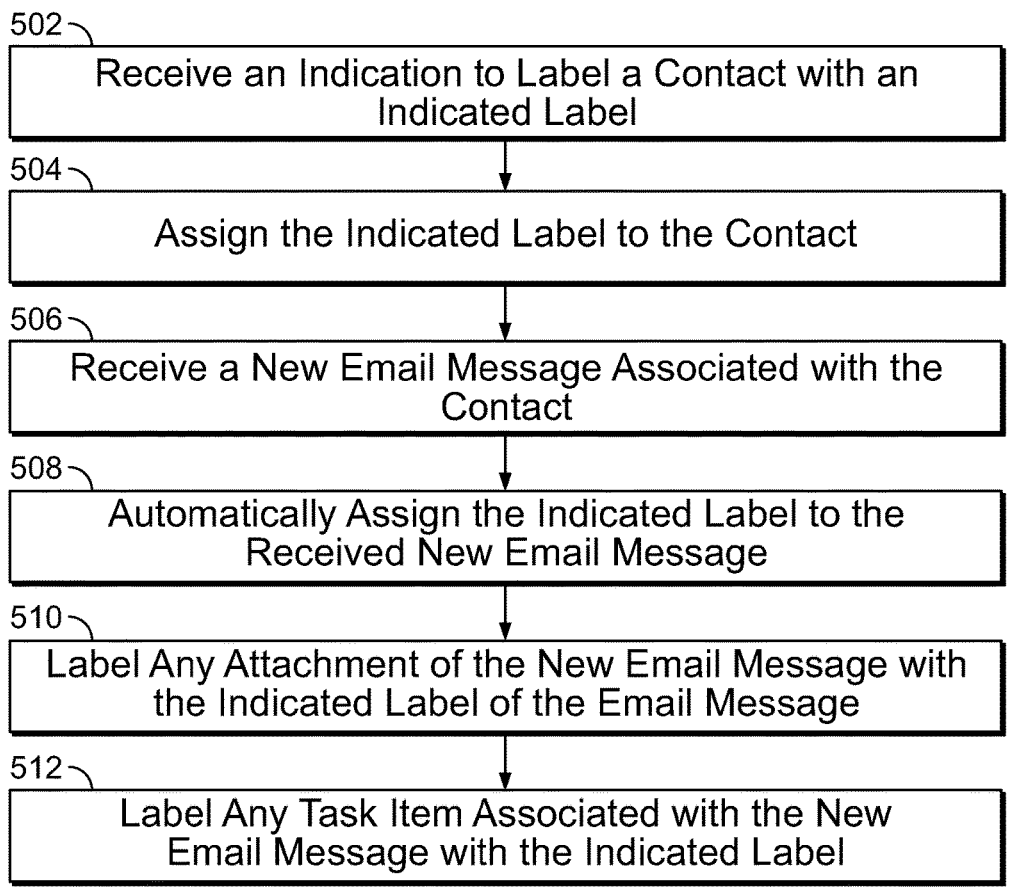
FIG. 5 is a flowchart illustrating an embodiment of a process for automatically labeling an email message.

FIG. 5 is a flowchart illustrating an embodiment of a process for automatically labeling an email message. The process of FIG. 5 may be implemented on one or more components of system 110 of FIG. 1. In some embodiments, at least a portion of the process of FIG. 5 is included in 214 of FIG. 2 and/or 304 of FIG. 3.

At 502, an indication to label a contact with an indicated label is received. In some embodiments, an email enhancement system stores contacts (e.g., address book contacts included in a digital address book) of a platform user of an email enhancement system and the platform user is able to assign one or more labels to each contact. When an email message from the contact is received, the email message from the contact may be automatically assigned any label assigned to the contact. The contact may include contact information (e.g., email address, physical address, telephone number, fax number, name, website address, instant message address, etc.) of a person and/or entity.

In some embodiments, the indication to label the contact is received via an interface provided by a user interface of the email enhancement system. For example, the indication is received via a webpage and/or mobile device application accessed by client 114 to indicate the label. In some embodiments, the indication is received at platform component 104 of FIG. 1. In some embodiments, the indication to label the contact is received via a text input in an input field dedicated to specifying a label for the contact. For example, a text provided in a text box dedicated to inputting labels is received as the label. In another example, a user selects a label among a list of labels to associate the selected label with the contact. In some embodiments, a user drags and drops to a specified user interface location a selected label among a list of labels to associate the selected label with the contact. In some embodiments, the contact is automatically assigned one or more labels. For example, the contact may be assigned a label based on an email address of the contact (e.g., domain of the email address assigned as a label of the contact). In some embodiments, an organization and/or administrator may automatically assign one or more labels to a contact of a platform user. For example, an organization may assign organization labels to contacts of the organization to standardize the labeling within the organization enterprise.

In some embodiments, one or more suggested labels are suggested based on an analysis of contact information of the contact, labels of other contacts that are associated with the contact of interest, labels of email messages from the contact, and/or labels of email messages sent to the contact. In some embodiments, one or more labels are assigned to the contact based on one or more rules. In some embodiments, a user, an organization (e.g., employer of the platform user), and/or an administrator is able to specify a rule/command that automatically adds a label to a contact if a specified information is included in the contact. For example, if the email address of the contact includes a certain specified text string, the contact is automatically labeled with one or more specified labels.

At 504, the indicated label is assigned to the contact. In some embodiments, assigning the indicated labels includes storing the indicated labels in one or more data structures/databases. For example, the indicated labels are stored with the contact in an enhanced contact database stored in storage 108 of FIG. 1. In some embodiments, contact labels are private to a specific platform user. In some embodiments, assigning the indicated label to the contact includes processing an enhancement associated with the label of the contact. For example, a processing rule is triggered based on the label. In some embodiments, assigning the indicated label includes labeling stored email messages received from the contact and/or sent to the contact with the indicated label.

At 506, a new email message associated with the contact is received. In some embodiments, the new email message is received from the contact. For example, the new email message is received as a part of the synchronization performed in 210 of FIG. 2. In some embodiments, the new email message is sent to the contact. For example, the new email message is the email message received, as in 302 of FIG. 3.

At 508, the indicated label is automatically assigned to the received new email message. For example, the new email message is automatically labeled with the indicated label because the recipient or sender of the new email has been associated with the indicated label in its contact information. In some embodiments, assigning indicated labels includes storing the indicated labels in one or more databases. For example, indicated labels are stored with the email message in the common email database. In some embodiments, the set of labels for each email message is unique to each user despite the only storing a single copy of the email message at the common email database. In some embodiments, assigning the indicated label to the email message includes processing an enhancement associated with the label. For example, a processing rule is triggered based on the label. Examples of the triggered action of the rule include providing a specified type of notification, modifying a marked status of the email message, deleting the email message, archiving the email message, forwarding the email message, and performing other actions associated with the email message.

In some embodiments, the indicated contact label assigned to the email message is not shared with other participants of the new email message. For example, although labels specified by a platform user for an email message are shared with other participants of the email message, labels automatically assigned based on labels assigned to a contact are not shared to other platform users. This may allow a platform user to assign personalized labels to contacts. For example, one user may label a contact as a "customer" while another user may label the same contact as a "merchant."

In some embodiments, any label of any email message included in an email thread is applied to the entire thread (e.g., applied to every message of the email thread). For example, labels are maintained on the email thread level rather than for each individual email message. In one example, when a label specified for a contact is assigned to an email message of an email thread, the new label is applied to the email thread and consequently all email messages of the email thread inherit the new label on an individual platform user basis.

At 510, any attachment of the new email message is labeled with the indicated label of the email message. In some embodiments, labeling an email attachment includes associating the label with the email attachment in a data entry of a data structure that stores the email attachment and/or the label.

At 512, any task item associated with the new email message is labeled with the indicated label. In some embodiments, labeling a task item includes associating the indicated label with the task item in a data entry of a data structure that stores and tracks the task item and/or the label.

Figure 6:
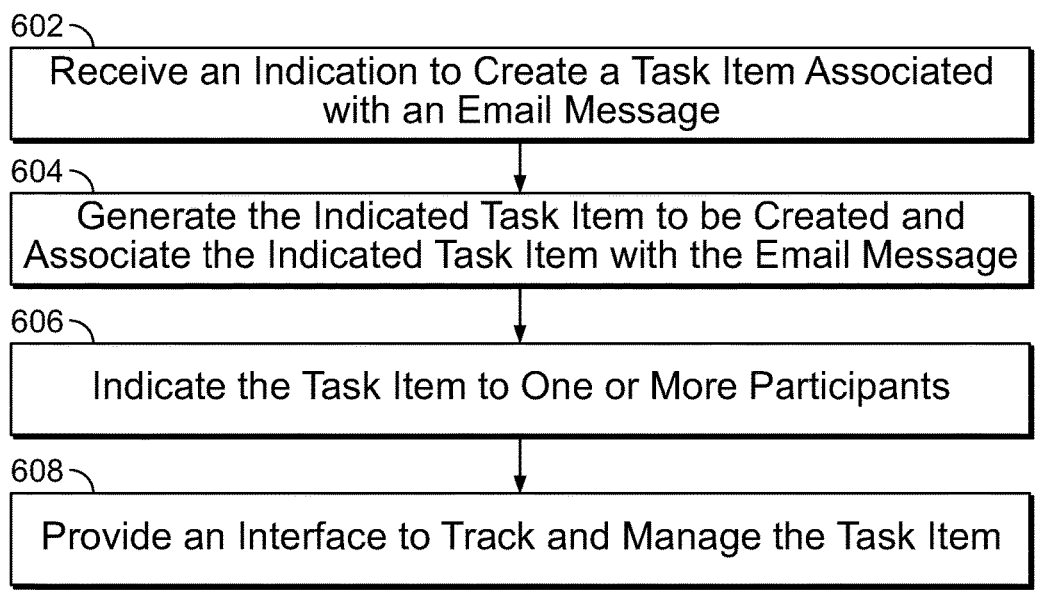
FIG. 6 is a flowchart illustrating an embodiment of a process for creating a task item.

FIG. 6 is a flowchart illustrating an embodiment of a process for creating a task item. The process of FIG. 6 may be implemented on one or more components of system 110 of FIG. 1. In some embodiments, at least a portion of the process of FIG. 6 is included in 214 of FIG. 2 and/or 304 of FIG. 3.

At 602, an indication to create a task item associated with an email message is received. In some embodiments, the task item is an item that is utilized to track tasks to do for a user. For example, the task item represents an entry in a list of to-do task items for a platform user. Using the list, the platform user may mark the task item as completed to track its completion.

In some embodiments, the indication to create the task item is received via a user interface of the email enhancement system. For example, the indication is received via a webpage and/or mobile device application utilized by client 114 of FIG. 1. In some embodiments, the indication is received at platform component 104 of FIG. 1. In some embodiments, the indication to create the task item is received via a text input in an input field dedicated to specifying a new task item. For example, a text provided in a text box dedicated to specifying a new task item is received as the to-do task item to be created and tracked. In some embodiments, the indication to create the task item is received via a selection of text within a content of an email message. In some embodiments, a user highlights one or more words in a body of the email message to indicate the selected word(s) as a description of the task item. For example, when a user highlights text of the email message, a context menu is provided and one of the items in the context menu indicates a command to utilize the highlighted text to create a task item. In some embodiments, a user may specify other parameters of the task item besides a description of the task item. For example, a due date, one or more labels, one or more recipients to be assigned the task item, and/or other task parameters may be prompted to be specified.

In some embodiments, the indication to create the task item is received via a text command included in content of the email message. For example, a user types a special command character(s) (e.g., "::") followed by a text identifier of the task item to specify a task item within the body text of the email message. In one example when a user types "::buy milk" within a body of the email message, the user creates a task item with the description "buy milk." In some embodiments, the special command character(s) to specify the label may be configurable. In some embodiments, a visual indication is provided that the text of the email message has been recognized as a task item. In some embodiments, a user may unmark content of the email message that has been recognized as a task item to indicate that the indicated content of the email message is not a task item. Other special command character(s) may be utilized to specify other parameters of the task item besides a description of the task item. For example, a due date, a label, a recipient to be assigned the task item, and/or other task parameters may be specified after special command character(s). In some embodiments, the text command is provided by an email sender that is not a platform user. For example, the email sender that is not a platform user may include a text command within a text body of an email message sent to a recipient platform user to create a task item.

In some embodiments, one or more suggested task items are suggested based on an analysis of the recipient of the email message, sender of the email message, subject of the email message, text content of the email message, an attachment of the email message, and/or other labels of the email message, and a user may select one or more of the suggested task items to create the selected suggested task item. In some embodiments, one or more task items are created based on one or more rules. For example, a user is able to specify a rule/command that automatically adds a task item if a specified condition and/or content is detected.

At 604, the indicated task item to be created is generated and associated with the email message. In some embodiments, generating the indicated task item and associating the task item with the email message include creating an entry in a data structure (e.g., database) that stores and tracks task items for a platform user. For example, the entry may include one or more identifiers of the following: a creator of the task time, an assigned user, a thread associated with the task item, an email message associated with the task item, a due date/time, a description, a label, and a completion status. In some embodiments, by automatically associating an email message with the task item, a user may be able to quickly reference the email message associated with the task item. For example, often a task item relates to context described in an email message and by automatically linking the task item with the associated email message, a user accessing the task item can quickly retrieve the associated email message to recall the context of the task item. Additionally, a user accessing the email message may be able to quickly retrieve task items resulting from the email message.

At 606, the task item is indicated to one or more participants. Although in some embodiments a platform user may create the task item for the platform user, in some embodiments, if the created task item was created in the context of an email message to be sent, the task item is to be potentially assigned to one or more recipients of the email message. For example, a recipient of the email message may choose to accept a task item specified in the message and the recipient will be only assigned the task item once the recipient accepts the task item. In some embodiments, the task item is explicitly assigned to a specified recipient. In some embodiments, when the task item is assigned to a participant (e.g., a participant of the email message), the task item is added to a list of task items for the participant. A plurality of recipients may be assigned the same task item. For example, the task item may be duplicated for each recipient that is assigned the task item.

At 608, an interface to track and manage the task item is provided. In some embodiments, the interface is provided via a webpage and/or an application (e.g., mobile application) utilized by client 114 of FIG. 1. For example, the webpage is provided by a platform component (e.g., platform component 104) and/or a mobile application communicates with the platform component to provide access to the task items managed by an email enhancement system.

In some embodiments, using the interface, a platform user is able to view task items of the platform user, search for task items of the platform user, indicate a task item as completed, view a completion status of a task item, accept a task item, and/or otherwise manage task items of the platform user. In some embodiments, a user interface that lists task items of a platform user is provided. For example, the user is provided an interface that organizes task items of the platform user under categories of accepted (e.g., lists task items that have been specifically assigned to the user), watching (e.g., lists task items that have been included in email messages received by the user but have not been specifically accepted by the user), open (e.g., lists task items that have not been marked as completed), completed (e.g., lists task items that have been marked as completed), and all (e.g., lists all task items of the user including both open and completed items). A user may select an interface button of each task item to either mark the task item as being completed or not completed. Another interface button may be provided to retrieve the email message/thread associated with the specific task item.

In some embodiments, within a user interface that displays an email message that specifies one or more task items, the text describing the task item(s) is indicated as referencing the task item(s). An interface button may be provided next to the text describing a task item to allow a user to mark the referenced task item as completed. The text describing a task item may be visually crossed out if the task item has been marked as completed.

In some embodiments, in the event a user is not a platform user (e.g., email account of the user is not registered/enhanced by an email enhancement system), the user is provided one or more hyperlinks to interact with a task item referenced in an email message. For example, because a user is not a platform user, the user may not have full access to the user interface of the platform to interact with the task item. When the email message referencing a task item is sent to a recipient that is determined to be not a platform user, one or more hyperlinks may be inserted in the email message. The hyperlink(s) may allow the recipient to directly indicate acceptance of the task item and/or completion of the task item. The hyperlink may be linked to a webpage where an interface to manage the task item is provided and/or may be linked with a specific action.

Figure 7:
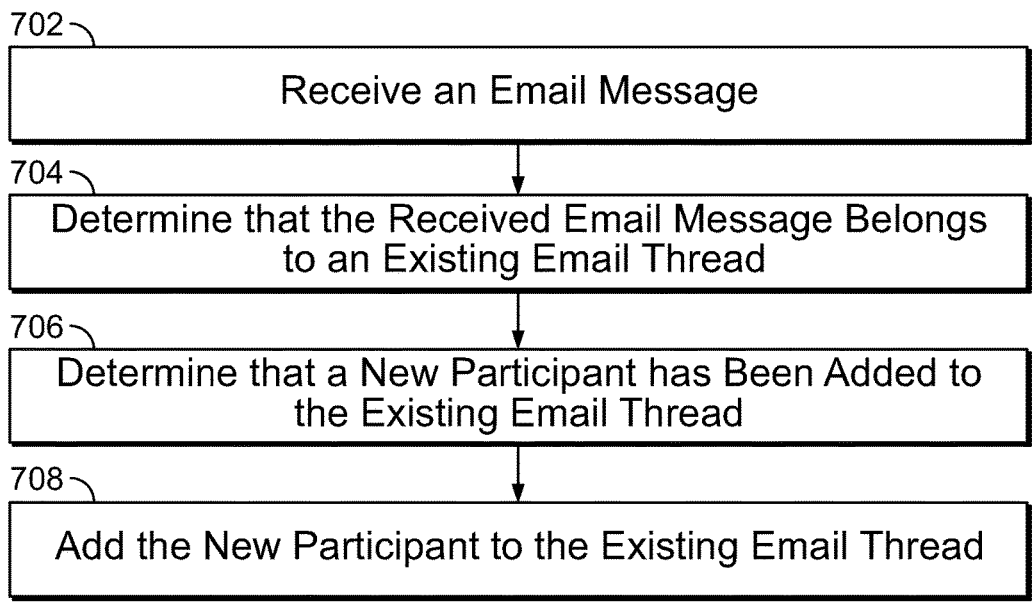
FIG. 7 is a flowchart illustrating an embodiment of a process for adding a participant to an email thread.

FIG. 7 is a flowchart illustrating an embodiment of a process for adding a participant to an email thread. The process of FIG. 7 may be implemented on one or more components of system 110 of FIG. 1. In some embodiments, at least a portion of the process of FIG. 7 is included in 214 of FIG. 2 and/or 304 of FIG. 3.

At 702, an email message is received. In some embodiments, the email message is an email message synchronized in 210 of FIG. 2. In some embodiments, the email message is the email message received in 302 of FIG. 3.

At 704, it is determined that the received email message belongs to an existing email thread. In some embodiments, a thread identifier that includes a header of the received email message identifies the email thread of the email message and it is determined that the included thread identifier matches an identifier of an existing email thread being tracked. For example, a thread identifier is obtained from the header of the received email message and a data structure that includes entries identifying tracked threads is searched to determine whether any of the tracked email threads is associated with the same thread identifier. In some embodiments, although a thread identifier is not included in a header of the received email message, it is determined that the received email message belongs to the existing email thread by analyzing one or more parameters of the message. For example, a subject of the email message, a sender of the email message, recipient(s) of the email message, quoted content of the email message, and/or other content of the email message is compared with one or more messages of the existing email thread to determine that there exists sufficient similarity to determine that the email message belongs to the existing email thread.

At 706, it is determined that a new participant has been added to the existing email thread. For example, a list of participants of the existing email thread is obtained from a data record of a data structure that catalogs email threads and the obtained list of participants is compared with participants of the received email message. The participants of the received email message may include the new participant that was not included in the list of participants of the existing email thread.

At 708, the new participant is added to the existing email thread. For example, an identifier of the new participant (e.g., email address) is added to the data record that tracks the email thread of the email enhancement system. In some embodiments, if it is determined that the new participant is a platform user of the enhanced email system tracking the email thread, the new participant is provided access to information associated with the entire email thread. For example, the new participant is provided access to all email messages, email attachments, and task items of the email thread. Although traditionally an email message of a traditional chain of email messages may include quoted content of previous email messages of the email chain, the quoted content may be incomplete with missing messages, missing email attachments, and missing information on the participants. By providing access to the complete email exchange history of the email thread, a participant added to the email thread is able to quickly catch up on the email thread. Additionally, the new participant is able to inherit other enhanced features such as labels and task items associated with the email thread. In some embodiments, if it is determined that the new participant was added by an email message sent by a sender that is not a platform user, a confirmation (e.g., an instruction provided in response a request to confirm intention of the sender) is required prior to allowing the new participant access to the complete content history of the email thread.

If the new participant is not a platform user, it may be still desirable to provide a more complete history of previous email messages of the email thread. In some embodiments, if it is determined that the new participant is not a platform user, the new participant is sent a generated digest email that provides a more complete email message history of the email thread. For example, complete message contents of all email messages of the email thread, email attachments of the email thread, and/or contact information of all participants of the email thread may be included in the digest email. Often a reply email message includes difficult to read history of email messages in various indented formats. The digest email may include contents of the email messages of the email thread in a reorganized/reformatted consistent format to ease readability of the email message history of the email thread. In some embodiments, if it is determined that the new participant was added by an email message sent by a sender that is not a platform user, a confirmation (e.g., an instruction provided in response a request to confirm intention of the sender) is required prior to sending the new participant the digest email.

In an alternative embodiment, when it is determined that a new participant has been added to the existing email thread, rather than adding the new participant to the existing email thread, a new/forked email thread is created.

Figure 8:
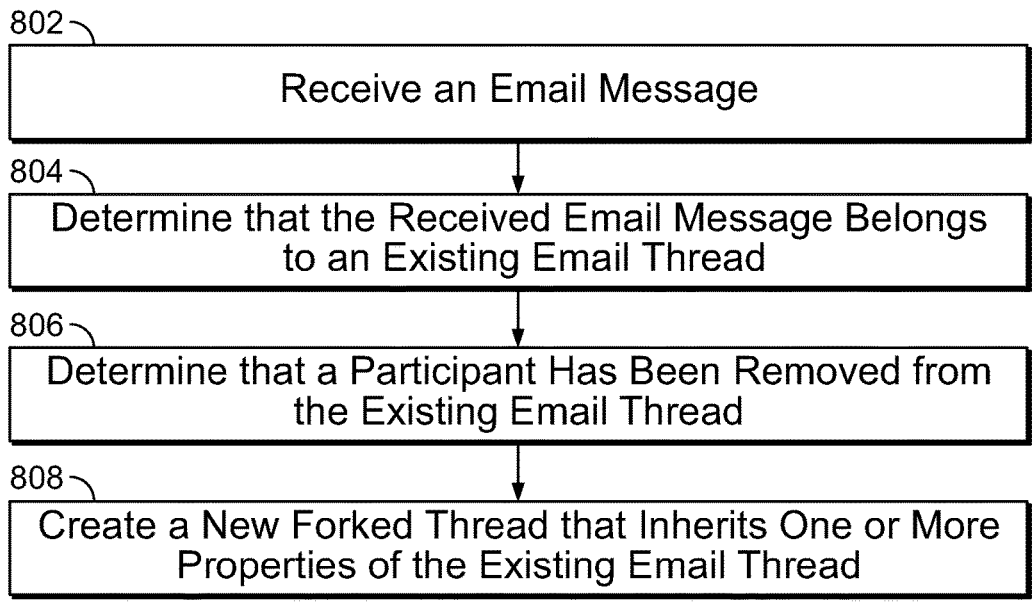
FIG. 8 is a flowchart illustrating an embodiment of a process for creating a forked thread due to a removed email thread participant.

FIG. 8 is a flowchart illustrating an embodiment of a process for creating a forked thread due to a removed email thread participant. The process of FIG. 8 may be implemented on one or more components of system 110 of FIG. 1. In some embodiments, at least a portion of the process of FIG. 8 is included in 214 of FIG. 2 and/or 304 of FIG. 3.

At 802, an email message is received. In some embodiments, the email message is an email message synchronized in 210 of FIG. 2. In some embodiments, the email message is the email message received in 302 of FIG. 3.

At 804, it is determined that the received email message belongs to an existing email thread. In some embodiments, a thread identifier that includes a header of the received email message identifies the email thread of the email message and it is determined that the included thread identifier matches an identifier of an existing email thread being tracked. For example, a thread identifier is obtained from the header of the received email message and a data structure that includes entries identifying tracked threads is searched to determine whether any of the tracked email threads is associated with the same thread identifier. In some embodiments, although a thread identifier is not included in a header of the received email message, it is determined that the received email message belongs to the existing email thread by analyzing one or more parameters of the message. For example, a subject of the email message, a sender of the email message, recipient(s) of the email message, quoted content of the email message, and/or other content of the email message is compared with one or more messages of the existing email thread to determine that there exists sufficient similarity to determine that the email message belongs to the existing email thread.

At 806, it is determined that a participant has been removed from the existing email thread. For example, a list of participants of the existing email thread is obtained from a data record of a data structure that catalogs email threads and the obtained list of participants is compared with participants of the received email message. It is determined that a list of participants of the received email message does not include a participant that was included in the list of participants of the existing email thread.

At 808, a new forked thread that inherits one or more properties of the existing email thread is created. For example, the removed participant is not simply removed from the existing email thread because when the removed participant responds to an old email message of the existing email thread, the removed participant may be inadvertently added to the existing email thread. This may expose the entire email message history of the email thread to the removed participant that may include email messages that intentionally were not supposed to be provided to the removed participant.

In some embodiments, creating the new forked thread includes assigning a new thread identifier to the forked thread and creating a new data record in the data structure cataloging email threads. The forked thread data record may include the new thread identifier and may inherit one or more properties of the existing email thread. For example, the labels and/or task items associated with the existing email thread in the data record corresponding to the existing email thread are copied to the new data record corresponding to the forked thread. In some embodiments, the new data record specifies the new list of participants that excludes the removed participant and identifies the received email message as an email message of the forked thread. The new data record may also reference the existing email thread and/or email messages of the existing email thread to allow participants of the new forked email thread to view the entire email message chain of progression from the existing email thread to the new forked email thread. A new email message provided in response to the received email message that caused the forked email thread to be created may include the new thread identifier of the forked email thread in the header of the new email message.

Figure 9:
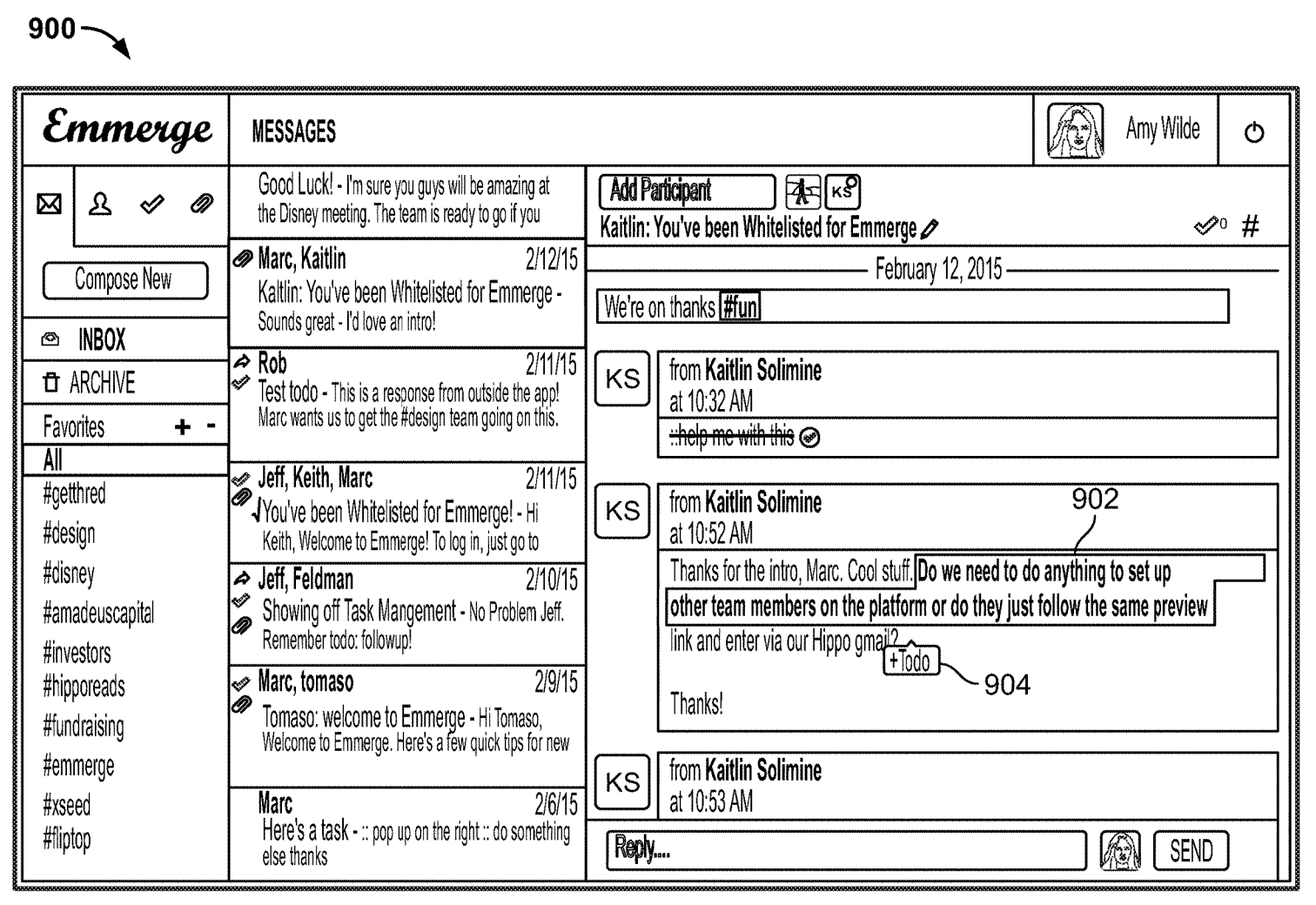

FIG. 9 is a diagram illustrating an example of a user interface for creating a task item. In some embodiments, FIG. 9 shows the user interface utilized to indicate the task item indicated in 602 of FIG. 6. Interface 900 shows text 902 of an email message that has been highlighted by a user. Context menu 904 has been provided in response to highlighting text 902. If the user selects the "+Todo" item of context menu 904, a new task item described by highlighted text 902 is created. The new task item will be associated with the email message of highlighted text 902.

Figure 10:
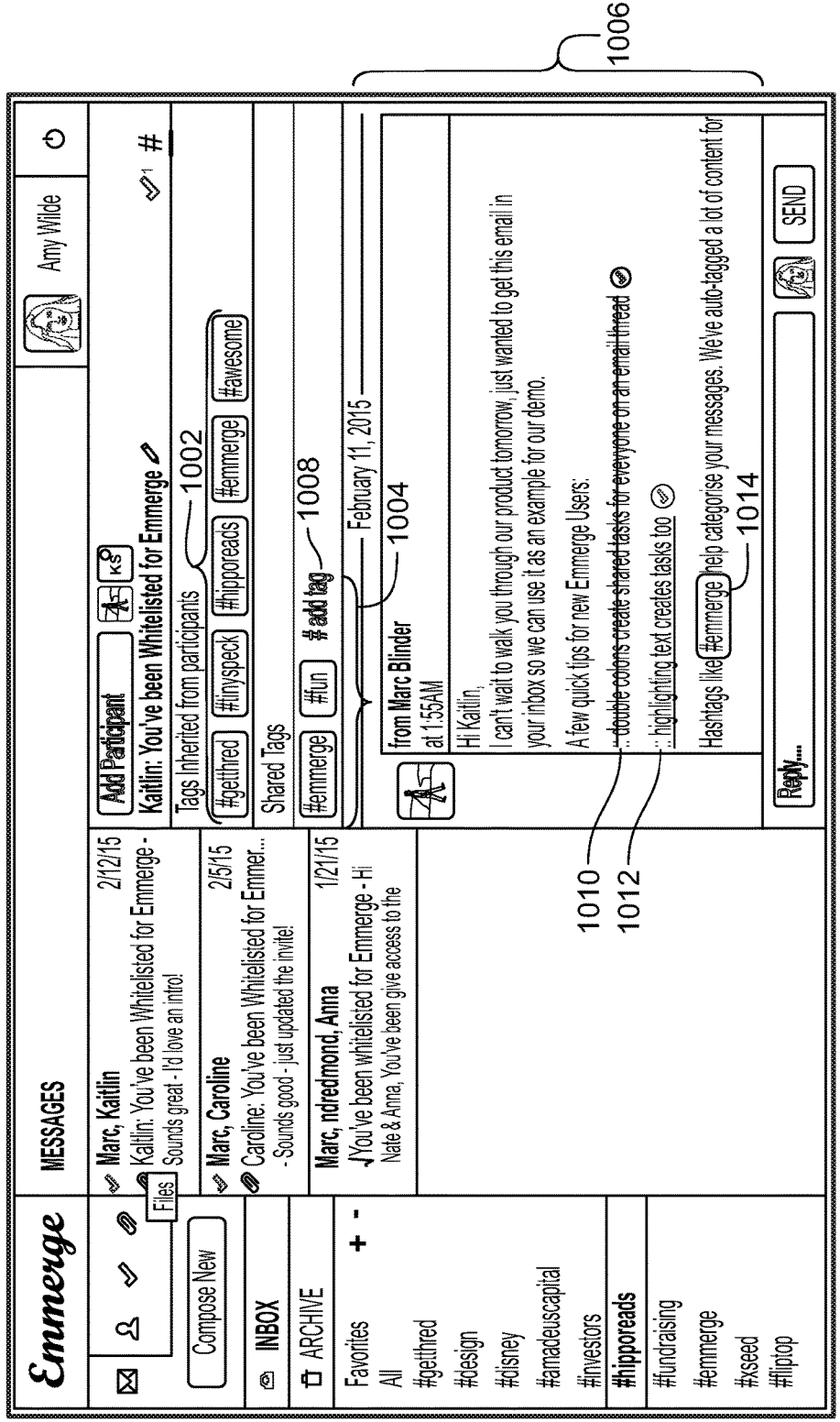
FIG. 10 is a diagram illustrating an example of a user interface of an enhanced email system platform.

FIG. 10 is a diagram illustrating an example of a user interface of an enhanced email system platform. In some embodiments, FIG. 10 shows the user interface utilized to indicate the task item indicated in 602 of FIG. 6 and/or the label indicated in 402 of FIG. 4. Interface 1000 shows labels 1002 inherited from other email participants of the email message/thread shown in interface area 1006. Interface 1000 shows labels 1004 that a subject platform user has specified for the email message/thread shown in interface area 1006. The subject user may specify a new label for the shown email thread by inputting a new label in text input box 1008. One or more of the shown labels may be removed by deleting the shown label from the shown interface.

Interface area 1006 shows a received email message that has specified two task items using a text command within contents of the email message. The special command characters "::" have been utilized to identify task items 1010 and 1012. Task item 1010 has been marked as completed and is visually indicated by the crossed out text and associated color filled check box icon. The check box icon may be selected to mark or unmark the task item as having been completed. Task item 1012 is visually indicated as a task item by the underlining of the text and the associated check box icon that may be selected to mark the task item as having been completed. Interface area 1006 shows the received email message that has specified a label within contents of the email message. The special command character "#" has been utilized to identify label 1014. Label 1014 is visually indicated as a label as shown by the colored highlight of the text of the label.

Figure 11:
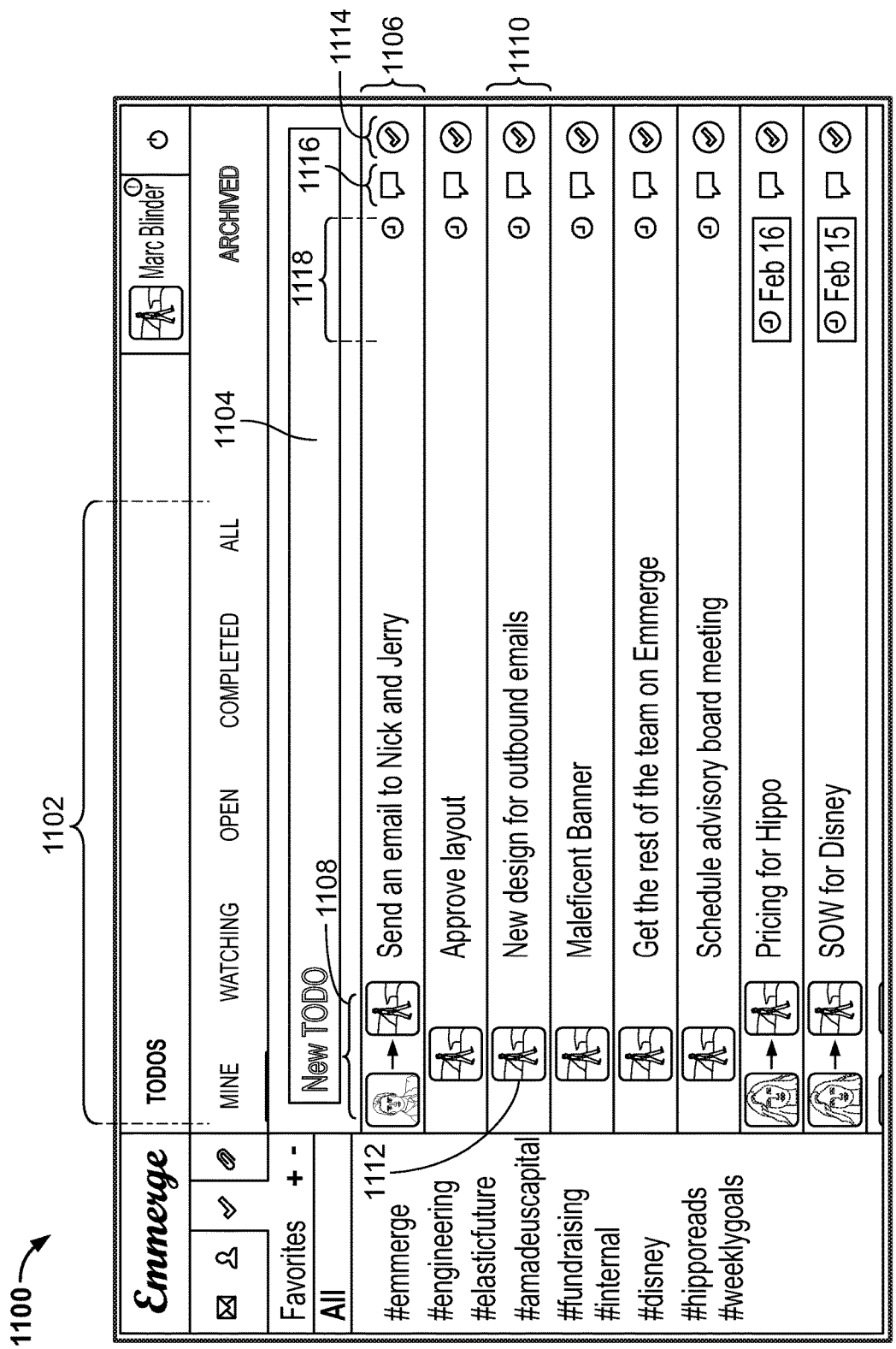
FIG. 11 is a diagram illustrating an example of a user interface for managing task items.

FIG. 11 is a diagram illustrating an example of a user interface for managing task items. In some embodiments, FIG. 11 shows the user interface provided in 608 of FIG. 6 to manage the task items.

Interface 1100 shows tabs 1102 that can be selected to list different types of task items of a platform user. Interface 1100 as shown is displaying the "mine" tab that has been selected to list task items that have been accepted by the platform user. The "watching" tab can be selected to list task items that have been included in email messages received by the user but that have not been specifically accepted by the user. The "open" tab can be selected to list task items that have not been marked as completed. The "completed" tab can be selected to list task items that have been marked as completed. The "all" tab can be selected to list all task items of the user including both open and completed items.

The platform user may input text to text box 1104 to create a new task item. Task item 1106 is a task item that has been assigned to the platform user by another user (e.g., as shown by icons 1108). Task item 1110 has been created by the subject platform user (e.g., as shown by icon 1112). The subject platform user may mark a listed task item as completed by selecting a corresponding check mark icon in icon column 1114. To view the email message associated with each list task item, the subject platform user may select a corresponding text bubble icon in icon column 1116. The assigned due date of the corresponding task, if applicable, is shown in icon column 1118. The platform user may set or modify the due date/time by selecting a corresponding clock icon in icon column 1118.

Figure 12:
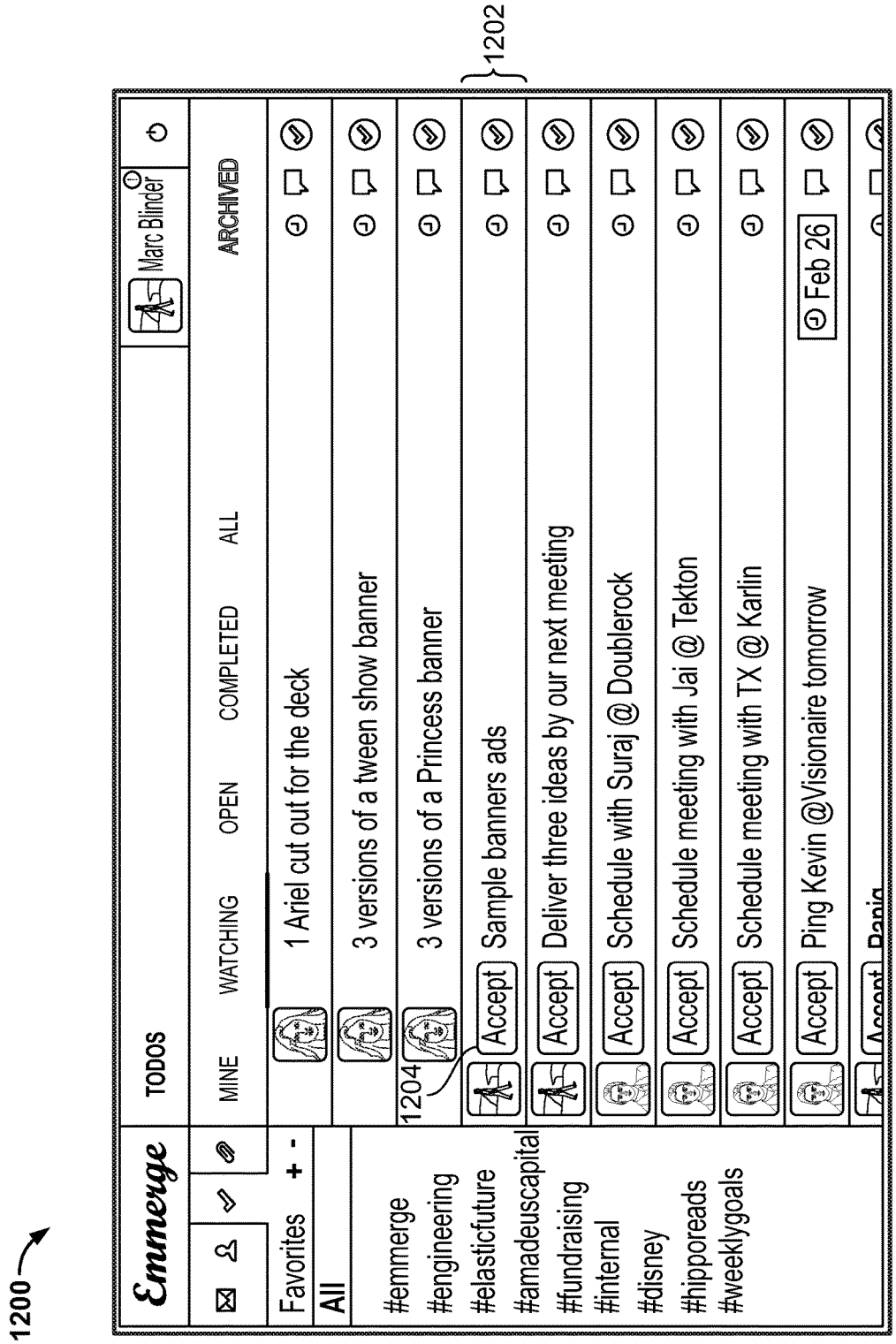
FIG. 12 is a diagram illustrating an example of a user interface for accepting task items.

FIG. 12 is a diagram illustrating an example of a user interface for accepting task items. In some embodiments, FIG. 12 shows the user interface provided in 608 of FIG. 6 to manage task items. Interface 1200 is the interface provided in response to selecting the "watching" tab in tabs 1102 of interface 1100 of FIG. 11. In order to accept task 1202, the subject platform user of interface 1200 may select button 1204.

Although the examples and embodiments discussed have been related to email, in various other embodiments, other forms of electronic messages (e.g., instant message, chat, etc.) may be similarly enhanced much like email message enhancements as discussed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for enhancing email, comprising:
   a processor configured to receive an email message;
   a storage configured to store content of the email message in a common email database including email data accessible by a plurality of platform users, wherein access to the email data is provided via a platform that provides enhanced messaging functions to the platform users; and
   a communication interface configured to:
      transmit the content of the email message via a conventional email system, wherein the content of the email message is accessible both via the platform and by an email client accessing the conventional email system;
      request one or more headers of one or more new email messages from the conventional email system, wherein the processor is further configured to analyze the one or more headers to identify whether any of the one or more headers includes an identifier inserted by the system for enhancing email; and
      request to the conventional email system, full contents of any of the one or more new email messages that has been identified to not include in its corresponding email header the identifier inserted by the system for enhancing email.

2. The system of claim 1, wherein the email message is received via the platform.

3. The system of claim 1, wherein the email message is received via a webpage.

4. The system of claim 1, wherein the email message is received via a mobile device application.

5. The system of claim 1, wherein a single copy of the email message is stored in the common email database for a plurality of participants of the email message.

6. The system of claim 1, wherein the conventional email system includes an IMAP server.

7. The system of claim 1, wherein the conventional email system includes a POP server.

8. The system of claim 1, wherein the conventional email system provides a webmail service.

9. The system of claim 1, wherein the platform provides a notification to a recipient of the email message that the email message has been received for the recipient.

10. The system of claim 1, wherein any new email messages are periodically synchronized between the system for enhancing email and the conventional email system.

11. The system of claim 1, wherein in the event a recipient of the email message is one of the platform users, a notification regarding the received email message is provided to the recipient prior to transmitting the content of the email message via the conventional email system.

12. The system of claim 1, wherein the system is further configured to provide the email message to a recipient of the email message via the platform.

13. The system of claim 1, wherein transmitting the content of the email message via the conventional email system includes transmitting the content of the email message to an email account of a sender of the email message.

14. The system of claim 1, wherein requesting the one or more headers includes authenticating with an authentication service using login credentials provided by a user.

15. The system of claim 1, wherein the communication interface is further configured to request from the conventional email system content of a selected email message from the new email messages.

16. A method for enhancing email, comprising:
   receiving an email message;
   storing content of the email message in a common email database including email data accessible by a plurality of platform users, wherein access to the email data is provided via a platform that provides enhanced messaging functions to the platform users;
   using a communication interface to transmit the content of the email message via a conventional email system, wherein the content of the email message is accessible both via the platform and by an email client accessing the conventional email system;
   requesting one or more headers of one or more new email messages from the conventional email system;
   analyzing the one or more headers to identify whether any of the one or more headers includes an identifier inserted by an email enhancement system; and
   requesting to the conventional email system, full contents of any of the one or more new email messages that has been identified to not include in its corresponding email header the identifier inserted by the email enhancement system.

17. The method of claim 16, wherein a single copy of the email message is stored in the common email database for a plurality of participants of the email message.

18. The method of claim 16, wherein in the event a recipient of the email message is one of the platform users, a notification regarding the received email message is provided to the recipient prior to transmitting the content of the email message via the conventional email system.

19. The method of claim 16, wherein requesting the one or more headers includes authenticating with an authentication service using login credentials provided by a user.

20. A computer program product for enhancing email, the computer program product being embodied in a non-transitory computer readable storage medium and comprising computer instructions for:

receiving an email message;

storing content of the email message in a common email database including email data accessible by a plurality of platform users, wherein access to the email data is provided via a platform that provides enhanced messaging functions to the platform users;

transmitting the content of the email message via a conventional email system, wherein the content of the email message is accessible both via the platform and by an email client accessing the conventional email system;

requesting one or more headers of one or more new email messages from the conventional email system;

analyzing the one or more headers to identify whether any of the one or more headers includes an identifier inserted by an email enhancement system; and requesting to the conventional email system, full contents of any of the one or more new email messages that has been identified to not include in its corresponding email header the identifier inserted by the email enhancement system.

\* \* \* \* \*